United States Patent [19]

Thelander

[11] 4,163,418
[45] Aug. 7, 1979

[54] COOKING APPARATUS

[75] Inventor: Keith Thelander, Manly West, Australia

[73] Assignee: Multimould Enterprises Pty. Ltd., Wynnum Central, Australia

[21] Appl. No.: 836,772

[22] Filed: Sep. 26, 1977

[30] Foreign Application Priority Data

Sep. 26, 1976 [AU] Australia .................. 7506/76

[51] Int. Cl.² ............................................. A47J 37/00
[52] U.S. Cl. ........................................ 99/374; 99/375; 99/380
[58] Field of Search .................. 99/372, 375, 374, 378, 99/380, 381, 428, 430, 439, 448, 402

[56] References Cited

U.S. PATENT DOCUMENTS

| | | | |
|---|---|---|---|
| 1,754,486 | 4/1930 | Schott | 99/372 |
| 1,939,017 | 12/1933 | Naeve | 99/378 |
| 2,780,163 | 2/1957 | Lee | 99/430 |
| 3,121,385 | 2/1964 | Funke | 99/374 |
| 3,358,586 | 12/1967 | Thorngren | 99/402 |

Primary Examiner—Billy J. Wilhite
Attorney, Agent, or Firm—Donald D. Jeffery

[57] ABSTRACT

A cooking apparatus, for simultaneously cooking a number of products, each a filling between two slices of bread buttered on their outer faces and toasted, has two oppositely arranged but otherwise similar cooking units mounted in frames, the lower one fixed, the upper one hinged to the lower. Each unit is a metal casting with a face plate and a series of hot plates, each with a rim extending from the face plate and with a peripheral cutting bead, and a concavity within the rim. The cooking units are simultaneously heated by electric heating elements on their reverse faces, and when the upper one is brought down onto the lower one, in the hot plates of which the products to be cooked are placed, the cutting beads of corresponding hot plates of upper and lower units coact to cut through the bread slices to trim excess, and to seal the edges of the slices together.

5 Claims, 5 Drawing Figures

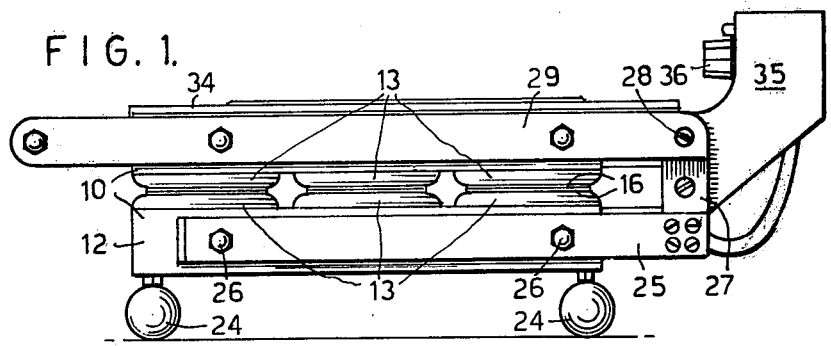
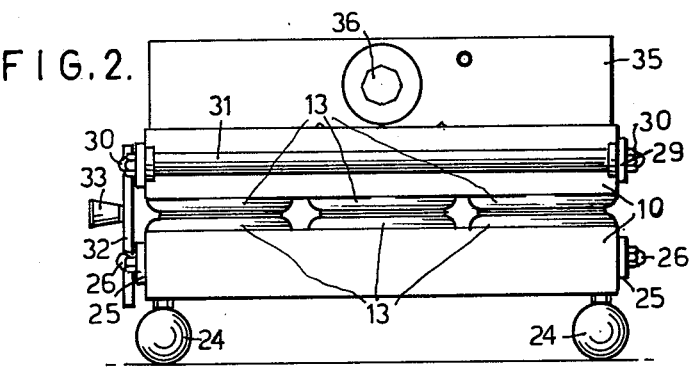
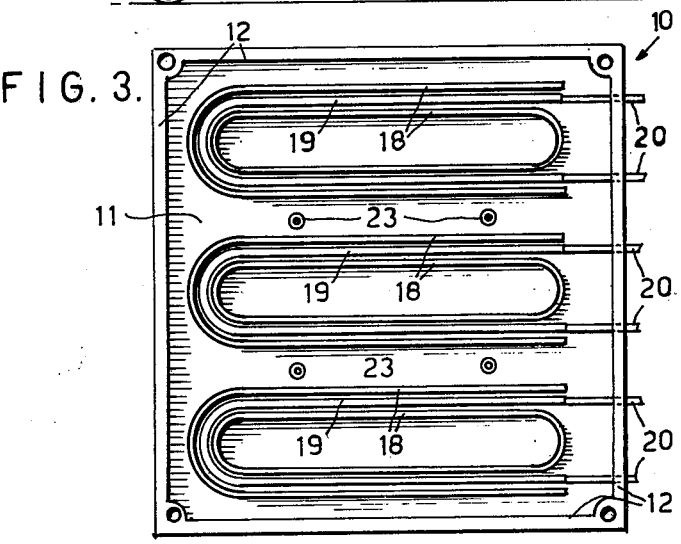

COOKING APPARATUS

BACKGROUND OF THE INVENTION

THIS INVENTION relates to cooking apparatus, and more particularly to apparatus for cooking a particular kind of product called a "jaffle", which consists of two slices of bread with filling between, the slices of bread being compressed and sealed together around the edge, the whole being toasted.

It is well known to make cooked products of this character by the use of a simple appliance consisting of two concave metal moulds hinged together and with handles extending in the direction away from the hinge, the bread slices with the interposed filling being placed between the moulds, the handles being brought and held together to compress the bread and filling, the protruding excess bread being trimmed from the edge of the superimposed moulds, and the moulds then being heated over a flame.

SUMMARY OF THE INVENTION

The general object of the present invention is to provide such apparatus which may be easily and conveniently operated to produce the said cooked food products at a very high rate, typically 150 per hour, the apparatus therefore being well suited for use at lunch counters or school tuckshops, and at sporting or other gatherings, when large volumes of food are required to be cooked and served in limited time.

With the foregoing and other objects in view, the invention resides broadly in cooking apparatus including an upper and a lower cooking unit, each having a metal face plate formed integrally with a series of hot plates each with a rim extending from the face plate, a concavity within the rim, and a cutting bead extending from the rim in the direction away from the face plate, the rims of the hot plates of the lower cooking unit extending up from its face plate, those of the upper cooking unit extending down from its face plate; means hingedly connecting the upper cooking unit to the lower cooking unit so the upper unit may be brought down on the lower unit, the cutting beads of the one registering with and contacting the corresponding cutting beads of the other, or may be raised clear of the lower cooking unit; and electric heating means for simultaneously heating the face plates and hot plates of the upper and lower cooking units.

BRIEF DESCRIPTION OF THE DRAWINGS

In order that a preferred embodiment of the invention may be readily understood and carried into practical effect, reference is now made to the accompanying drawings, wherein:

FIG. 1 is a side elevation of cooking apparatus according to the invention,

FIG. 2 is a front elevation of the apparatus shown in FIG. 1,

FIG. 3 is a plan view of the interior of either one of the two cooking units of the apparatus.

DETAILED DESCRIPTION OF THE PREFERRED EMBODIMENT OF THE INVENTION

The cooking apparatus illustrated includes two similar but oppositely arranged cooking units 10, each square in plan view, and each consisting of a single metal casting of hollow box-like form having a face plate 11 and four integrally cast side plates 12.

Figure 4:
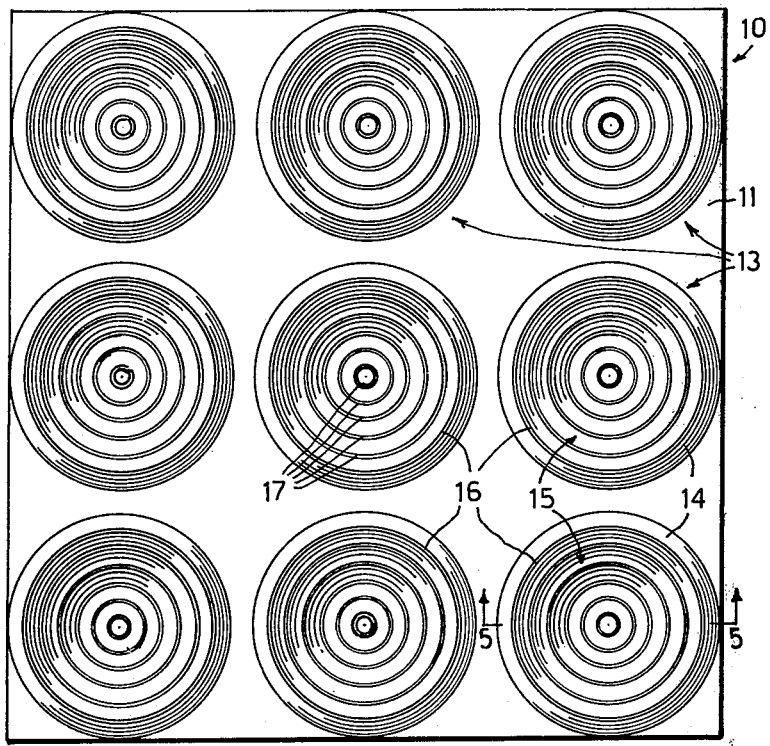
FIG. 4 is a plan view, to larger scale, of part of one of the cooking units of the apparatus.

A series of cooking hot-plates 13 are formed integrally with the face plate 11, each of these, as shown in FIG. 4, being circular in plan view, having a rim 14 extending from the face plate, and a concavity 15 within the circular rim, the depth of the concavity being greater than the depth of the rim. The concavity is of substantially frusto-conical form, the substantially flat bottom of the concavity being parallel to the surface of the face plate 11.

Around the top of the rim there is a projecting circular cutter bead 16. A number of further coaxial circular beads 17 are formed about the frusto-conical wall of the concavity, and extending up from the concavity bottom.

Extending from the reverse side of the face plate 11 are a series of integrally cast heating element locating ribs 18, for locating a series of electric heating elements 19, the leads 20 of which pass through holes formed in one of the side plates 12 of the cooking unit. A layer 21 of heat insulating material applied to the heating elements 19 is held in place by a retaining plate 22 held by screws (not shown) engaged in tapped apertures in bosses 23 formed integrally with the face plate 11.

The lower of the two cooking units of the apparatus has its hot plates 13 uppermost, and it is mounted on feet 24 at its corners. A bottom frame 25 is secured to this lower cooking unit by bolts 26, and extends rearwards of the cooking unit 10 where it supports standards 27 to which are pivoted at 28 the rear ends of a top frame 29 secured by bolts 30 to the upper cooking unit 10, the hot plates 13 of which are normally lowermost. The top frame 29 extends forwardly of the upper cooking unit 10 and includes a transverse front handle 31 by means of which the upper cooking unit 10 may be lifted up clear of the lower cooking unit. A stay 32 pivoted to the top frame 29 and the bottom frame 25 limits the upward pivotal movement of the upper cooking unit, and automatically operates to retain the upper cooking unit in its raised position, the stay being releasable by means of a knob 33 to permit the upper cooking unit to be lowered. When the upper cooking unit 10 is in fully lowered position, as shown in FIGS. 1 and 2, the circular cutter beads 16 of its series of hot plates 13 are brought down, in register, onto the cutter beads 16 of the corresponding hot plates of the lower cooking unit.

A cover plate 34 is secured over the top of the upper cooking unit 10 of the apparatus.

A heater control box 35 is mounted above the rear of the bottom frame 25, and encloses wiring and terminals (not shown) for the electrical circuit of the apparatus, including a variable control thermostat of any well-known type, controlled by a knob 36.

Figure 5:
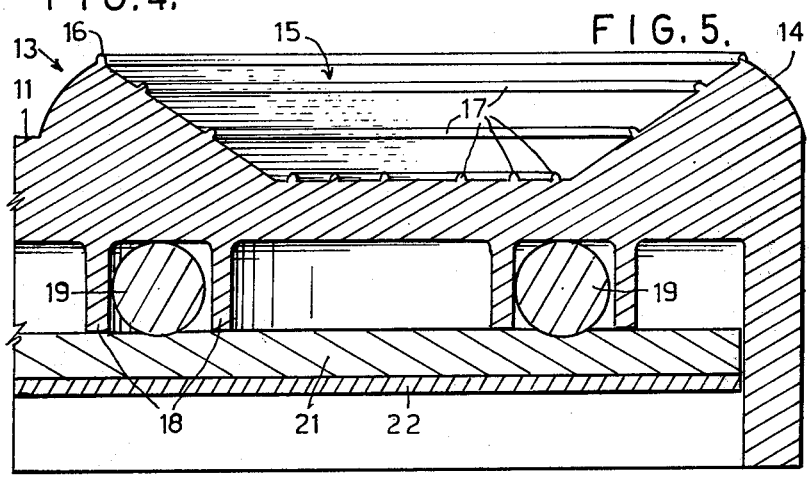
FIG. 5 is a sectional view along line 5—5 in FIG. 4.

In use, the apparatus is heated by the heating elements to the required temperature. The upper cooking unit 10 is raised, and in each of the concave hot plates 13 of the lower cooking unit 10 there is placed a product to be cooked and consisting of two slices of bread, each buttered on one side, and brought together with a quantity of a filling between them, the buttered sides of the bread slices being outermost. The upper cooking unit is then lowered, and the cutter beads 16 of each pair of upper and lower hot plates are brought together, cutting through the superimposed bread slices to trim away the excess bread, and to seal the two slices together. In about three or four minutes, the whole of the external surface of the enclosed product is toasted, and the filling is heated to about 180° F. The upper cooking unit 10 is then raised by means of the handle 31, and kept raised by the stay 32, so the cooked products can be conveniently removed, and replaced by a further supply of products to be cooked. The residual heat of the cast cooking units 10 ensures that the cooked products can be produced at a very rapid rate. It will be noted in this regard that the thickness of the face plate 11 in the regions thereof surrounding the hot plates 13 is approximately one-half the combined thickness of the face plate and hot plates, as clearly seen in FIG. 5.

What we claim is:

1. Cooking apparatus including: a bottom frame, a top frame hingedly connected to the bottom frame, oppositely arranged but otherwise similar upper and lower metal cooking units mounted respectively in the top and bottom frames, each of the cooking units including a generally flat face plate and a series of hot plates integrally formed with said face plate, each of said hot plates having a circular rim extending outwardly from the face plate, a concavity within the rim in which the food to be cooked is positioned, and a circular cutting bead at the outer edge of the rim, electrical heating means for simultaneously heating the face plates and series of hot plates of both cooking units, said electrical heating means including electrical heating elements mounted in contact with the surface of each cooking unit face plate remote from the hot plates of the unit, said heating elements being confined in locating ribs formed integrally with and extending downwardly from said surfaces of said plates, the thickness of said face plate in the regions thereof surrounding said hot plates being approximately one-half the thickness of said face plate in the region of said integrally formed hot plates, the positioning of said heating elements and the integral formation of said hot plates and said face plate creating residual heat in said hot plates between cooking sequences thereby ensuring the production of cooked products at a rapid rate, said cooking units being so constructed and hingedly connected that when the top frame is lowered relative to the bottom frame, the cutting beads of the hot plates of the one are brought into register and contact with the cutting beads of the hot plates of the other, thereby permitting protruding excess food to be trimmed from the edges of the superimposed hot plates.

2. The cooking apparatus of claim 1 wherein at least four hot plates are provided on each cooking unit.

3. The cooking apparatus of claim 1 wherein nine hot plates are provided on each unit, all integrally formed with said face plate.

4. The cooking apparatus of claim 1 further including a layer of insulating material disposed outwardly of said ribs, and a retaining plate for retaining said layer of insulating material in place.

5. The cooking apparatus of claim 1 wherein the concavity of each hot plate is formed with a plurality of coaxial, outwardly spaced circular beads, similar beads being formed in the bottom wall of the concavity, which is parallel to the surface of said face plate.

* * * * *